(12) United States Patent  (10) Patent No.: US 8,316,646 B2
Baran  (45) Date of Patent: Nov. 27, 2012

(54) FAN VARIABLE AREA NOZZLE FOR A GAS TURBINE ENGINE FAN NACELLE WITH DRIVE RING ACTUATION SYSTEM

(75) Inventor: Kenneth C. Baran, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 826 days.

(21) Appl. No.: 12/521,037

(22) PCT Filed: Mar. 5, 2007

(86) PCT No.: PCT/US2007/063255
§ 371 (c)(1),
(2), (4) Date: Jun. 24, 2009

(87) PCT Pub. No.: WO2008/108847
PCT Pub. Date: Sep. 12, 2008

(65) Prior Publication Data
US 2010/0058769 A1  Mar. 11, 2010

(51) Int. Cl.
*F02K 1/00* (2006.01)
(52) U.S. Cl. .......... 60/771; 60/226.1; 60/226.3; 60/770
(58) Field of Classification Search .................. 60/770, 60/771, 226.2, 226.3, 226.1, 262, 228, 242; 239/265.39, 265.19, 265.33, 265.37
See application file for complete search history.

(56) References Cited

U.S. PATENT DOCUMENTS

| | | | |
|---|---|---|---|
| 2,800,766 A | 9/1952 | Hemsworth | |
| 3,747,341 A * | 7/1973 | Davis | 60/226.2 |
| 3,875,742 A * | 4/1975 | McMurtry et al. | 60/226.2 |
| 5,261,605 A * | 11/1993 | McLafferty et al. | 239/265.35 |
| 5,782,431 A | 7/1998 | Gal-Or et al. | |
| 6,299,077 B1 * | 10/2001 | Harmon et al. | 239/265.37 |
| 7,637,095 B2 * | 12/2009 | Winter et al. | 60/226.1 |
| 7,721,549 B2 * | 5/2010 | Baran | 60/770 |
| 7,797,944 B2 * | 9/2010 | Morford et al. | 60/771 |
| 8,104,261 B2 * | 1/2012 | Marshall et al. | 60/226.2 |
| 2009/0266912 A1* | 10/2009 | Gukeisen | 239/265.33 |

FOREIGN PATENT DOCUMENTS
EP  0512833 A1  11/1992
GB  2120172  8/1972

OTHER PUBLICATIONS

Search Report and Written Opinion mailed on Jan. 14, 2008 for PCT/US2007/063255.
Notification of Transmittal of the International Preliminary Report on Patentability mailed on Jan. 21, 2009 for PCT/US2007/063255.

* cited by examiner

*Primary Examiner* — William H Rodriguez
(74) *Attorney, Agent, or Firm* — Carlson, Gaskey & Olds PC

(57) ABSTRACT

A fan variable area nozzle (FVAN) includes a flap assembly which varies a fan nozzle exit area. The flap assembly generally includes a multiple of flaps, flap linkages and an actuator system. The actuator system radially and axially translates a drive ring relative an engine centerline axis. A slot within the drive ring receives the flap linkages to asymmetrically and symmetrically vary the fan nozzle exit area in response to movement of the drive ring.

20 Claims, 9 Drawing Sheets

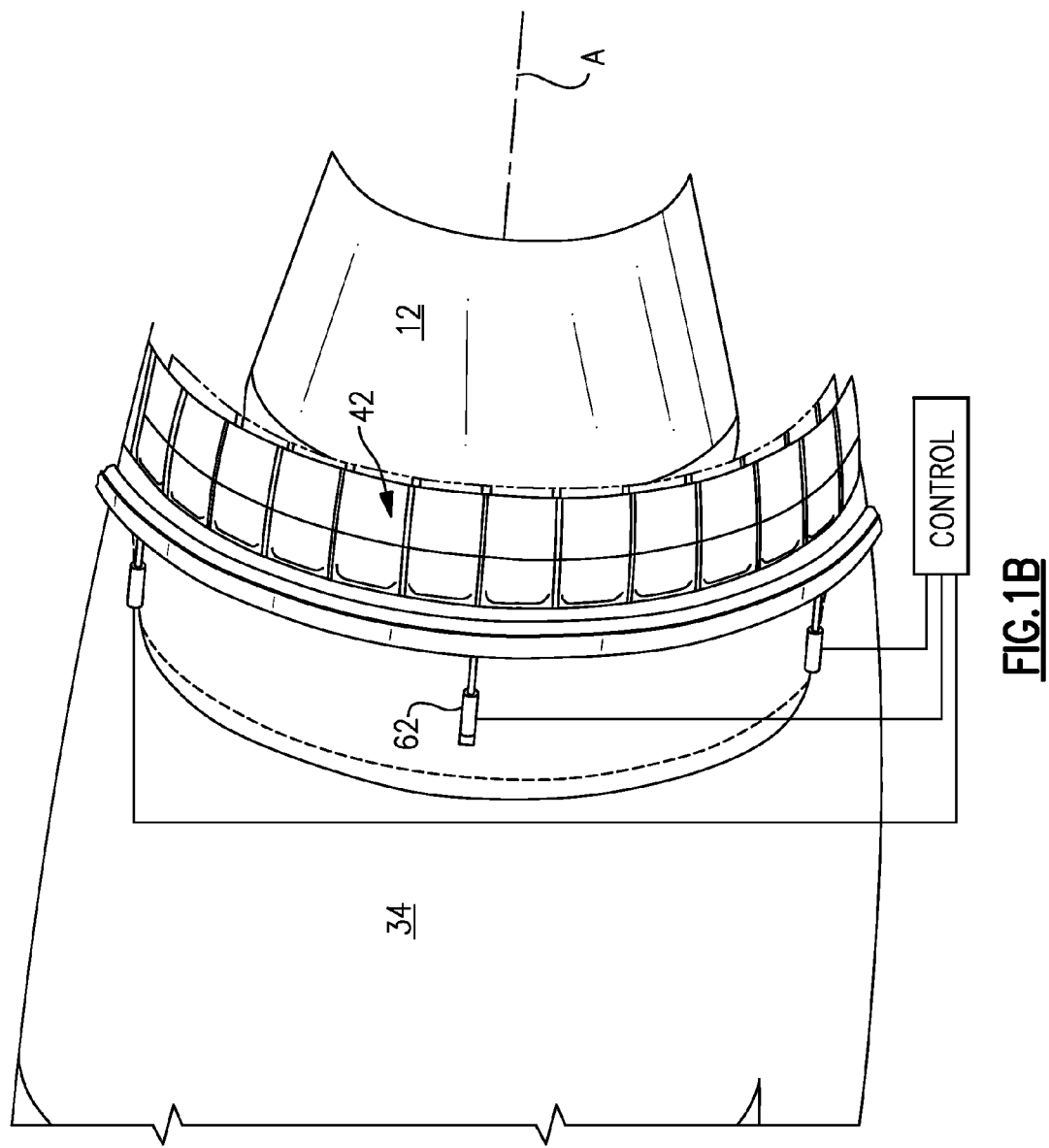

FAN VARIABLE AREA NOZZLE FOR A GAS TURBINE ENGINE FAN NACELLE WITH DRIVE RING ACTUATION SYSTEM

BACKGROUND OF THE INVENTION

The present invention relates to a gas turbine engine, and more particularly to a turbofan engine having an axially and radially translating drive ring to provide symmetrical and asymmetrical control of the fan nozzle exit area and the direction of the engine thrust vector.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between an outer fan nacelle and an inner core nacelle. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzles provide a smaller fan exit nozzle area during cruise conditions and a larger fan exit nozzle area during take-off and landing conditions. Existing fan variable area nozzles typically utilize relatively complex mechanisms that increase overall engine weight to the extent that the increased fuel efficiency therefrom may be negated. The direction of the fan discharge air is also generally rearward and provides no vectoring capability.

Accordingly, it is desirable to provide an effective, lightweight fan variable area nozzle with thrust vectoring capability for a gas turbine engine.

SUMMARY OF THE INVENTION

A fan variable area nozzle (FVAN) according to the present invention includes a flap assembly which varies a fan nozzle exit area. The flap assembly is incorporated into an end segment of the fan nacelle to include a trailing edge thereof.

The flap assembly generally includes a multiple of flaps, flap linkages and an actuator system. The actuator system radially and axially translates a drive ring having a circumferentially continuous slot or discrete slots which receives the flap linkage of each flap to asymmetrically and symmetrically vary the fan nozzle exit area.

In operation, the multiple of actuators axially translate the drive ring to adjust the entire fan nozzle exit area in a symmetrical manner. By symmetrically adjusting the FVAN, engine thrust and fuel economy are maximized during each flight regime (e.g., take-off and cruise). In addition to the axial translation of the drive ring, the multiple of actuators may radially translate the drive ring off of an engine axis to asymmetrically vary the fan nozzle exit area and vector the thrust. Notably, thrust vectoring is achieved at any axially translated position of the drive ring as the thrust vectoring is achieved independently of symmetrical FVAN area control. Thrust vectoring provides for shorter take offs and enhance maneuverability on the ground and in the air.

A slot ceiling and a slot floor may have a non-constant radius contour in the circumferential direction to effect the vectoring of the flaps offset ninety degrees from the direction of drive ring movement. As the non-constant radius provides a pitch bias to those flaps in response to movement of the interface over the non-constant radius contour rather than the absence of pitching resulting from a constant radius, the non-constant radius contour facilitates fine tuning of the intermediate FVAN sectors in response to radial translation of the drive ring. In the case of a circumferentially continuous slot, the non-constant slot ceiling and slot floor contours would repeat periodically around the circumference.

In another embodiment, the slot is non-linear. In response to radial translation of the drive ring, the curved slot results in non-linear vectoring of the FVAN from a baseline position.

The present invention therefore provides an effective, lightweight fan variable area nozzle and thrust vectoring system for a gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1B is a perspective partial fragmentary view of the engine;

DETAILED DESCRIPTION OF THE DISCLOSED EMBODIMENT

Figure 1A:
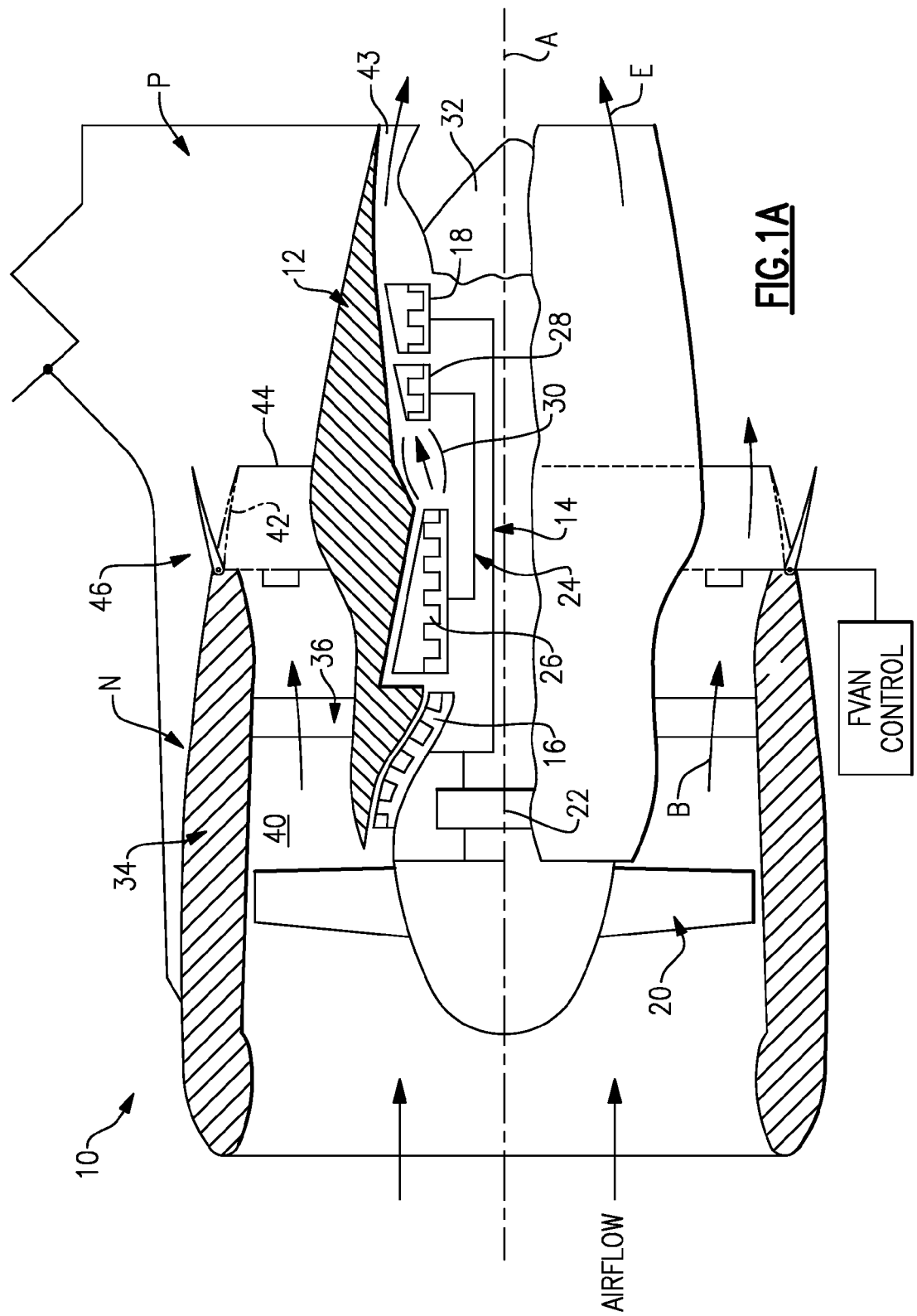
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. In the illustrated engine architecture, which is referred to as a geared turbofan, the low spool 14 drives a fan 20 through a gear train 22. The high spool 24 includes a high pressure compressor 26 and high pressure turbine 28. A combustor 30 resides between the high pressure compressor 26 and high pressure turbine 28. The low and high spools 14, 24 rotate independently about an engine axis of rotation A.

The engine 10 is a high-bypass geared turbofan aircraft engine. The engine 10 bypass ratio is greater than ten (10), the turbofan diameter is significantly larger than that of the low pressure compressor 16, and the low pressure turbine 18 has a pressure ratio that is greater than five (5). The gear train 22 is an epicycle gear train such as a planetary gear system or other gear system with a gear reduction ratio of greater than 2.5. It should be understood, however, that the above parameters are only exemplary of a preferred geared turbofan engine and that the present invention is likewise applicable to other gas turbine engines including direct drive fans in which the fan is directly coupled to the low spool.

Airflow enters a fan nacelle 34, which circumscribes the core nacelle 12 along at least part of its length. The fan 20 communicates airflow into the core engine for compression by the low pressure compressor 16 and the high pressure compressor 26. Core airflow compressed by the low pressure compressor 16 and the high pressure compressor 26 is mixed with the fuel in the combustor 30 and ignited. The resultant combustion products expand through the high pressure turbine 28 and low pressure turbine 18. The turbines 28, 18 are coupled for rotation with, respective, spools 24, 14 to rotationally drive the compressors 26, 16 and through the gear train 22, the fan 20 in response to the expansion. A core engine exhaust flow E exits the core nacelle 12 through a core nozzle 43 defined between the core nacelle 12 and a tail cone 32.

The core nacelle 12 is supported within the fan nacelle 34 by structure 36 often generically referred to as an upper and lower bifurcation. A bypass flow path 40 is defined radially between the core nacelle 12 and the fan nacelle 34. The engine 10 is a high bypass engine in which approximately 80 percent of the airflow entering the fan nacelle 34 is bypass flow B that enters the bypass flow path 40 rather than the core airflow. The bypass flow B communicates through the generally annular bypass flow path 40 and is discharged from the engine 10 through a fan variable area nozzle (FVAN) 42 (also illustrated in FIG. 1B) which defines a fan nozzle exit area 44 between the fan nacelle 34 and the core nacelle 12.

Thrust is a function of density, velocity, and area. One or more of these parameters can be manipulated to vary the amount and direction of thrust provided by the bypass flow B. The FVAN 42 changes the physical area and geometry to manipulate the thrust provided by the bypass flow B. However, it should be understood that the fan nozzle exit area 44 may be effectively altered by methods other than structural changes, for example, by altering the boundary layer. Furthermore, it should be understood that effectively altering the fan nozzle exit area 44 is not limited to physical locations proximate the exit of the fan nacelle 34, but rather, may include the alteration of the bypass flow B at other locations.

The FVAN 42 defines the fan nozzle exit area 44 for axially discharging the fan bypass flow B pressurized by the upstream fan 20. A significant amount of thrust is provided by the bypass flow B due to the high bypass ratio. The fan 20 of the engine 10 is designed for a particular flight condition—typically cruise at approximately 0.8M and 35,000 feet.

Because the fan 20 is designed for efficiency at the cruise condition, the FVAN 42 is operated to vary the fan nozzle exit area 44 for efficient engine operation at other flight conditions, such as landing and takeoff and to meet other operational parameters such as noise level. The FVAN 42 defines a nominal converged cruise position for the fan nozzle exit area 44 and radially opens relative thereto to define a diverged position for other flight conditions. The FVAN 42 provides an approximately 20% (twenty percent) change in the fan exit nozzle area 44. It should be understood that other arrangements as well as essentially infinite intermediate positions as well as thrust vectored positions in which some circumferential sectors of the FVAN 42 are converged or diverged relative to other circumferential sectors are likewise usable with the present invention.

In operation, the FVAN 42 communicates with a controller or the like to adjust the fan nozzle exit area 44 in a symmetrical and asymmetrical manner. Other control systems including an engine controller or flight control system may likewise be usable with the present invention. By adjusting the entire periphery of the FVAN 42 symmetrically in which all sectors are moved uniformly, thrust efficiency and fuel economy are maximized during each flight condition. By separately adjusting each flap 50 of the FVAN 42 to provide an asymmetrical fan nozzle exit area 44, engine fan bypass flow is selectively vectored to provide, for example only, trim balance, thrust controlled maneuvering, enhanced ground operations and short field performance.

Figure 2:
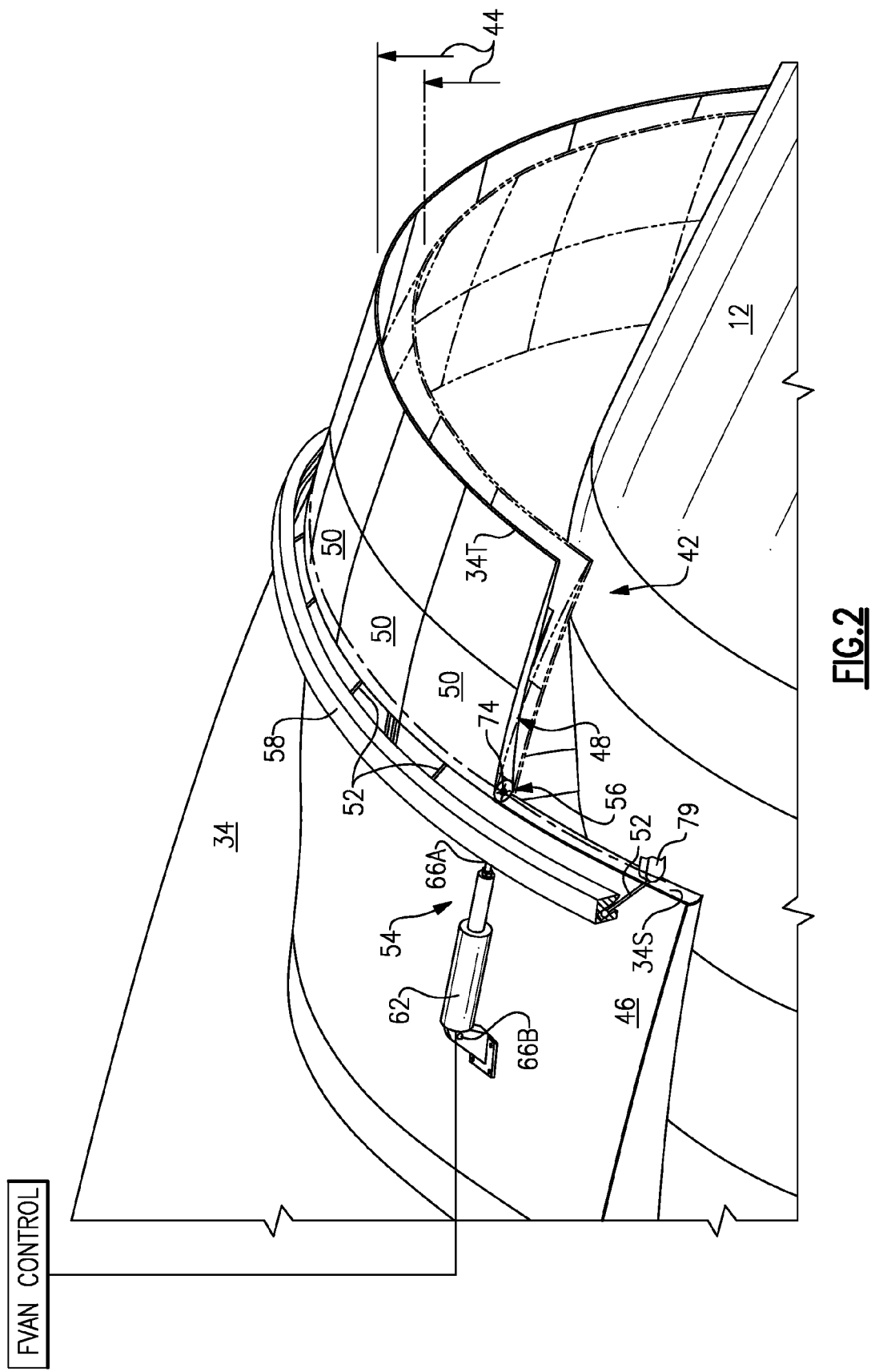
FIG. 2 is a partial perspective view of the FVAN.

Referring to FIG. 2, the FVAN 42 generally includes a flap assembly 48 which varies the fan nozzle exit area 44. The flap assembly 48 is incorporated into the fan nacelle 34 to define a trailing edge 34T thereof. The flap assembly 48 generally includes a multiple of flaps 50, a respective multiple of flap linkages 52 and an actuator system 54.

The actuator system 54 includes a multiple of actuators 62 which are mounted to or adjacent a fixed structure such as the fan nacelle 34. In a preferred embodiment, the actuators 62 are linear actuators. Each actuator 62 is mounted to a drive ring 58 at a respective pivotal actuator attachment 66A. Each actuator 62 is also mounted to the fan nacelle 34 at a respective pivotable actuator attachment 66B. The multiple of actuators 62 operate in response to the controller C to axially and radially position the drive ring 58 relative the engine axis A to vary the fan nozzle exit area 44 defined by the FVAN 42 through which the fan air B is discharged.

Each flap 50 is pivotably mounted to the fan nacelle 34 through a hinge 56 and linked to the drive ring 58 through the respective flap linkage 52. The flap 50 is attached to the flap linkage 52 and supports the hinge 56 which pivotally mounts the flap 50 and flap linkage 52 to a fan nacelle segment 34S about a fixed hinge line 74 defined by the hinge 56. The hinge line 74 is defined about the circumference of the FVAN 42. Each hinge 56 may include bearings, bushings or flexures as generally understood. Each flap 50 may also include an interface seal arrangement such that each flap 50 engages and overlaps an adjacent flap 50 to provide an overlapping flap-seal circumferential interface seal for asymmetrical operation.

Figure 3A:
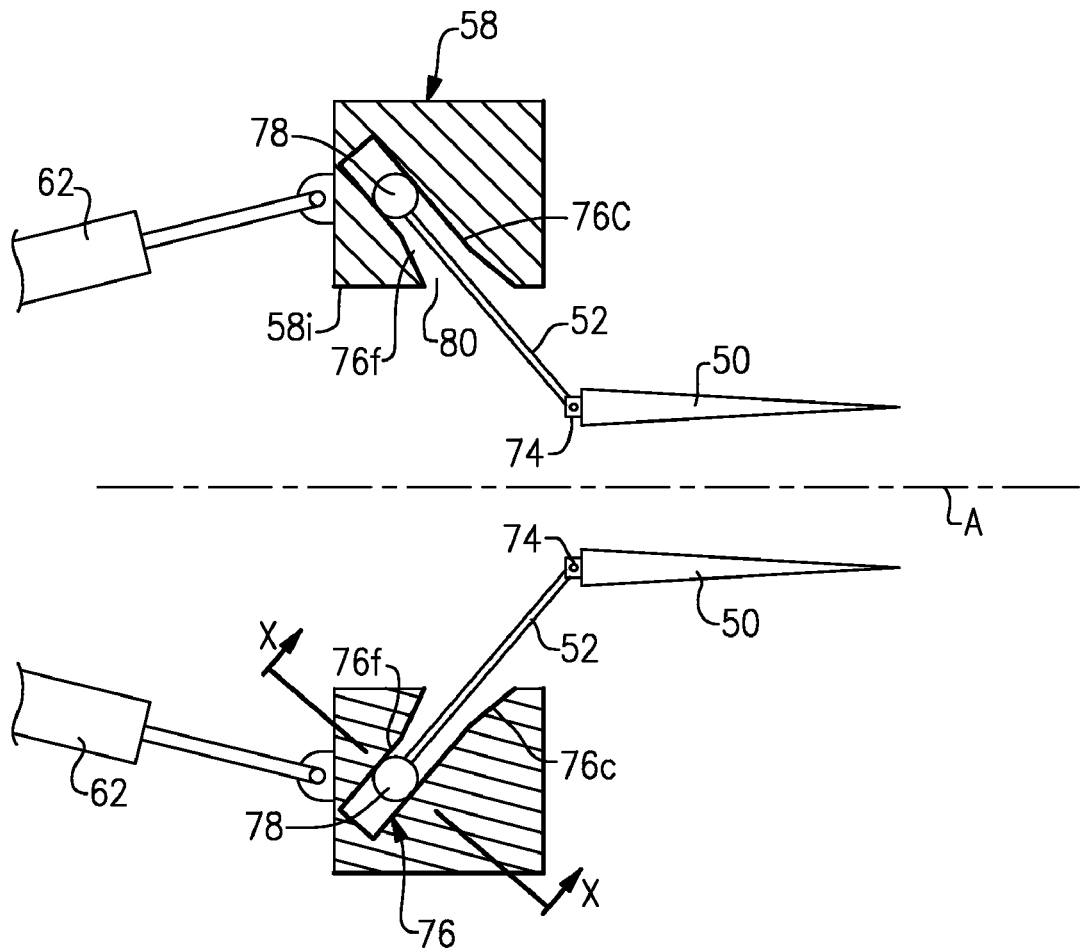
FIG. 3A is a schematic longitudinal sectional view of the FVAN.

Referring to FIG. 3A, the drive ring 58 includes a circumferentially continuous slot 76 which receives the flap linkage 52 of each flap 50. Alternatively, the slot 76 may be formed as a multiple of discrete slots 76, one for each flap linkage 52. The flap linkage 52 includes an interface 78 such as a ball, roller, bearing, sliding, rolling or such like interface which provides a close fit and minimal friction between the flap linkage 52 and the slot 76 during movement of the drive ring 58. That is, the interface provides minimal play in a direction transverse to the slot 76 yet provides minimal friction for movement along the slot 76.

Figure 3B:
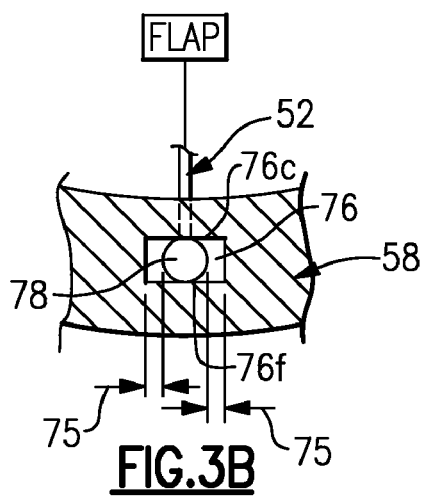
FIG. 3B is a sectional view of a discrete slot for one flap in the drive ring taken along line X-X in FIG. 3A.
Figure 3C:
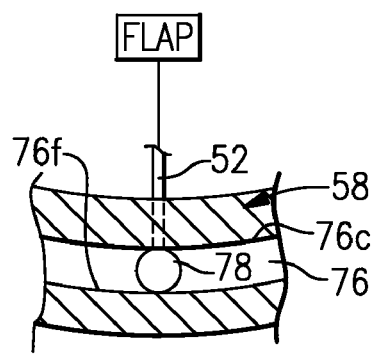
FIG. 3C is a sectional view of a circumferentially continuous slot in the drive ring taken along line X-X in FIG. 3A.

The slot 76 defines an opening 80 which extends through an inner diameter 58i of the drive ring 58. The slot 76 may include a flared opening (schematically illustrated in FIG. 3A) depending on the kinematics of the flap linkage 52. The slot 76 is angled relative to a radius of the drive ring 58. The flared opening of the slot 76 is angled aft toward each associated flap 50. The slot 76 essentially defines a frustro-conical void within the drive ring 58. Should the slot 76 be defined from a multiple of discrete slots 76, each slot 76 provides a circumferential clearance 75 relative to the interface 78 (FIGS. 3B and 6B). It should be understood that should the slot 76 be circumferentially continuous, such circumferential clearance is inherently provided thereby (FIG. 3C). Notably, irrespective of how the circumferential clearance is obtained, the interface 78 is restrained by a slot ceiling 76C and a slot floor 76F. The interface 78 engages the slot ceiling 76C and the slot floor 76F at a line or point contact to provide a close fit and minimal friction therebetween.

Each flap 50 pivots about the circumferential hinge line 74. That is, the flap linkage 52 defines a fixed relationship with the associated flap 50—here schematically illustrated as an approximately one hundred thirty five degree relationship for explanatory purposes, however, other geometric relationships—such as in FIG. 4 where the relationship is schematically illustrated as an approximately ninety degree relationship will likewise be utilized with the present invention.

Figure 4:
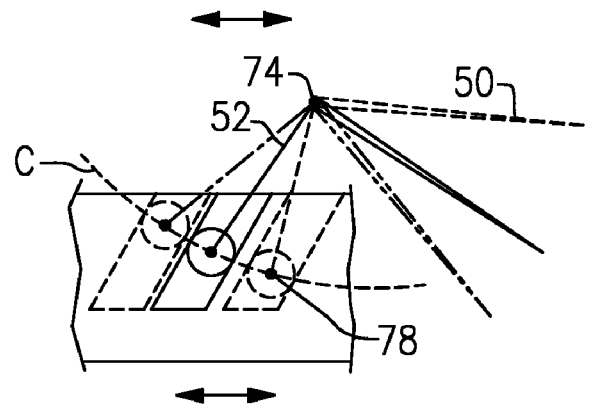
FIG. 4 is a schematic longitudinal sectional view of the drive ring in a multiple of axially translated positions.

Axial translation of the drive ring 58 results in pivotal movement of the flap linkage 52 about the fixed hinge line 74, such that the flap 50 articulates between an open and a closed position (FIG. 4). The interface 78 defines an arcuate path C relative to the fixed hinge line 74 as the drive ring 58 is axially translated as a consequence of the interface 78 being captured within the slot 76. In other words, the interface 78 moves slotwise within the slot 76 in response to axial translation of the drive ring 58 which pivots the flap linkage about the fixed hinge line 74 and thus pivots the flap 50.

In operation, the multiple of actuators 62 axially translate the drive ring 58 along the longitudinal engine axis A. The axial translation of the drive ring 58 drives each flap 50 through the flap linkage 52 to result in pivotal movement of the flap assembly 48 about the circumferential hinge line 74. Axial translation of the drive ring 58 adjusts the entire fan nozzle exit area 44 in a symmetrical manner as the entire flap assembly 48 is synchronously operated. The fan nozzle exit area 44 is in a most closed position when the drive ring 58 is in a full aft position and in a most open position when the drive ring 58 is in a full forward position (also illustrated graphically in FIG. 4). Although the foregoing example has shown the slot 76 as a linear slot (as seen in a cross-sectional side elevation view), non-linear slots can alternatively be utilized depending on the desired relationship between drive ring translation and flap angle as will be further described below.

Figure 8:
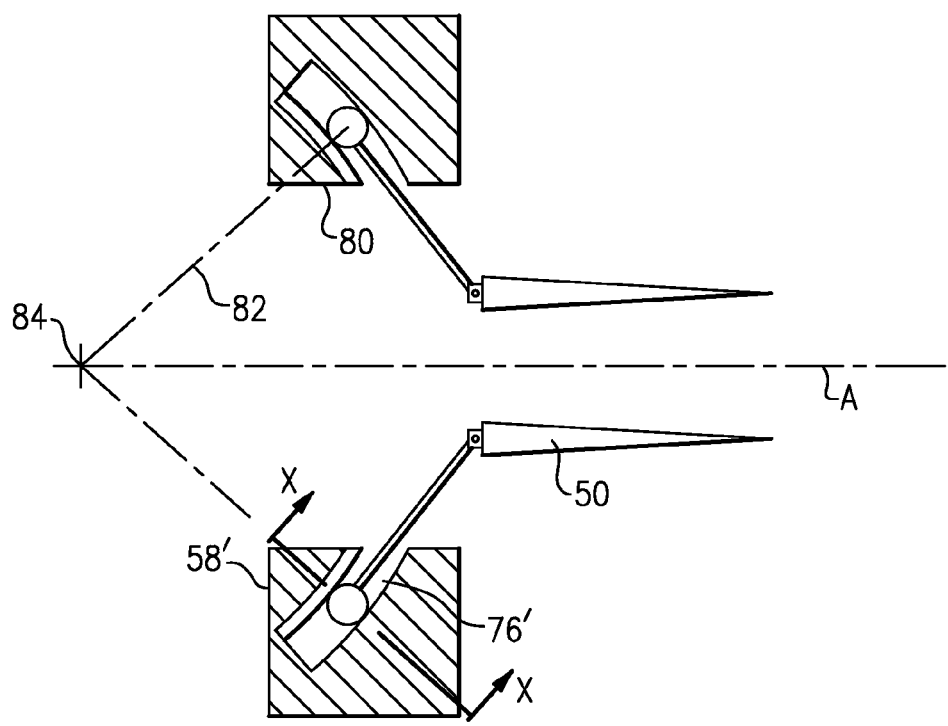
FIG. 8 is a schematic longitudinal sectional view of another embodiment of the FVAN with slots having a curved component.

Referring to FIG. 8, the slot 76' may alternatively be non-linear. That is, rather than being angled in a linear manner (FIG. 3A), the slot 76' is curved as seen in a cross-sectional side elevation view. The slot 76' extends through the inner diameter 80 of the drive ring 58' and includes a curved component. The curved component is defined by a radius 82 with an origin 84 axially offset from the drive ring 58'. It should be understood that other non-circular radiuses may likewise be utilized herewith.

Figure 6A:
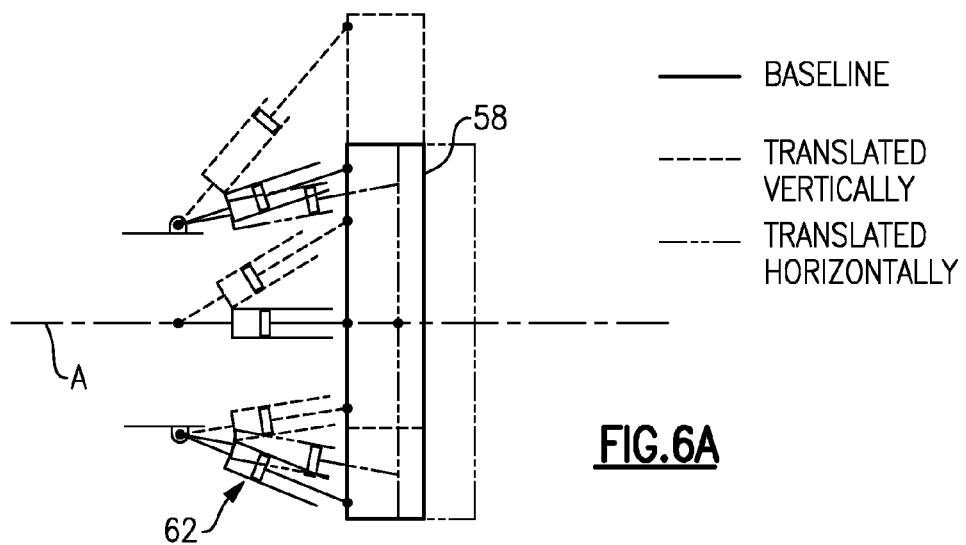
FIG. 6A is a schematic longitudinal sectional view of the drive ring in a radially translated "upward" position.
Figure 6B:
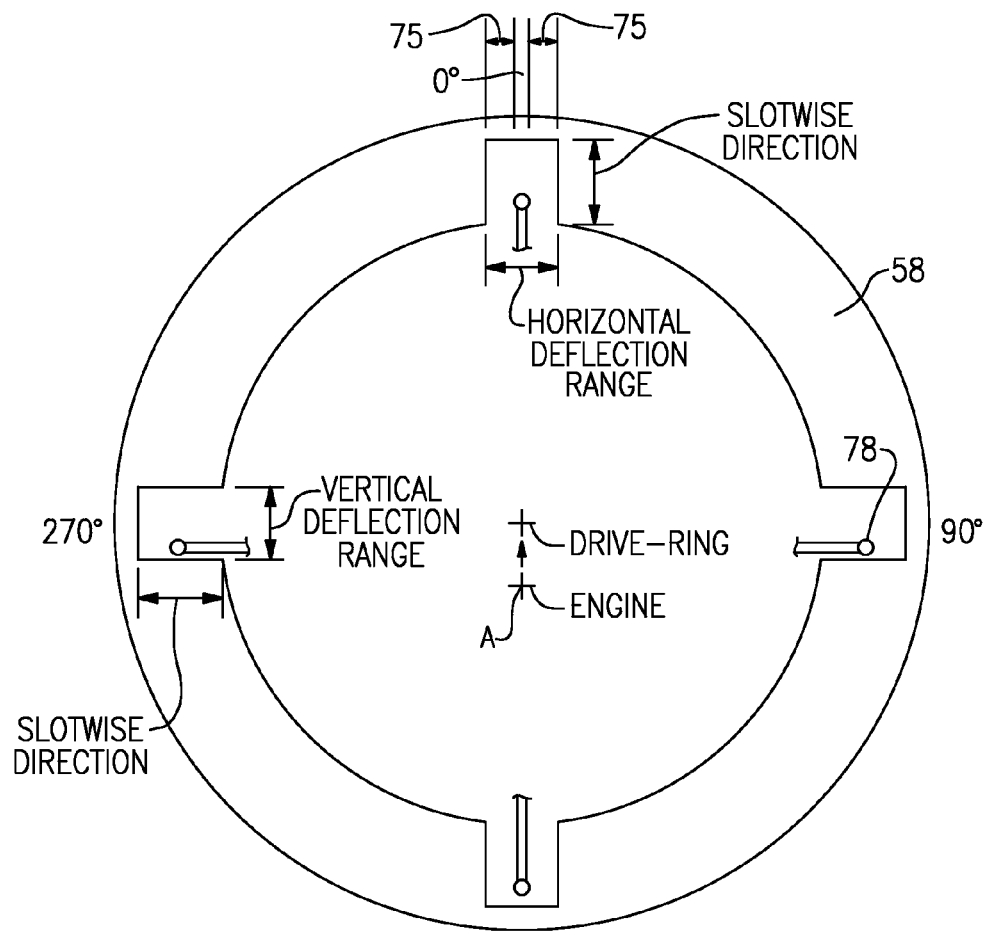
FIG. 6B is a front sectional view of the drive ring in the radially translated "upward" position.

In addition to the axial translation of the drive ring 58, the multiple of actuators 62 may radially translate the drive ring 58 off of the engine axis A to asymmetrically vary the fan nozzle exit area 44 and vector thrust (FIGS. 6A and 6B). The radial translation may be in the vertical or the horizontal direction. Notably, thrust vectoring is achieved at any axially translated position of the drive ring 58 as the thrust vectoring is achieved independently of symmetrical FVAN area control.

Figure 5:
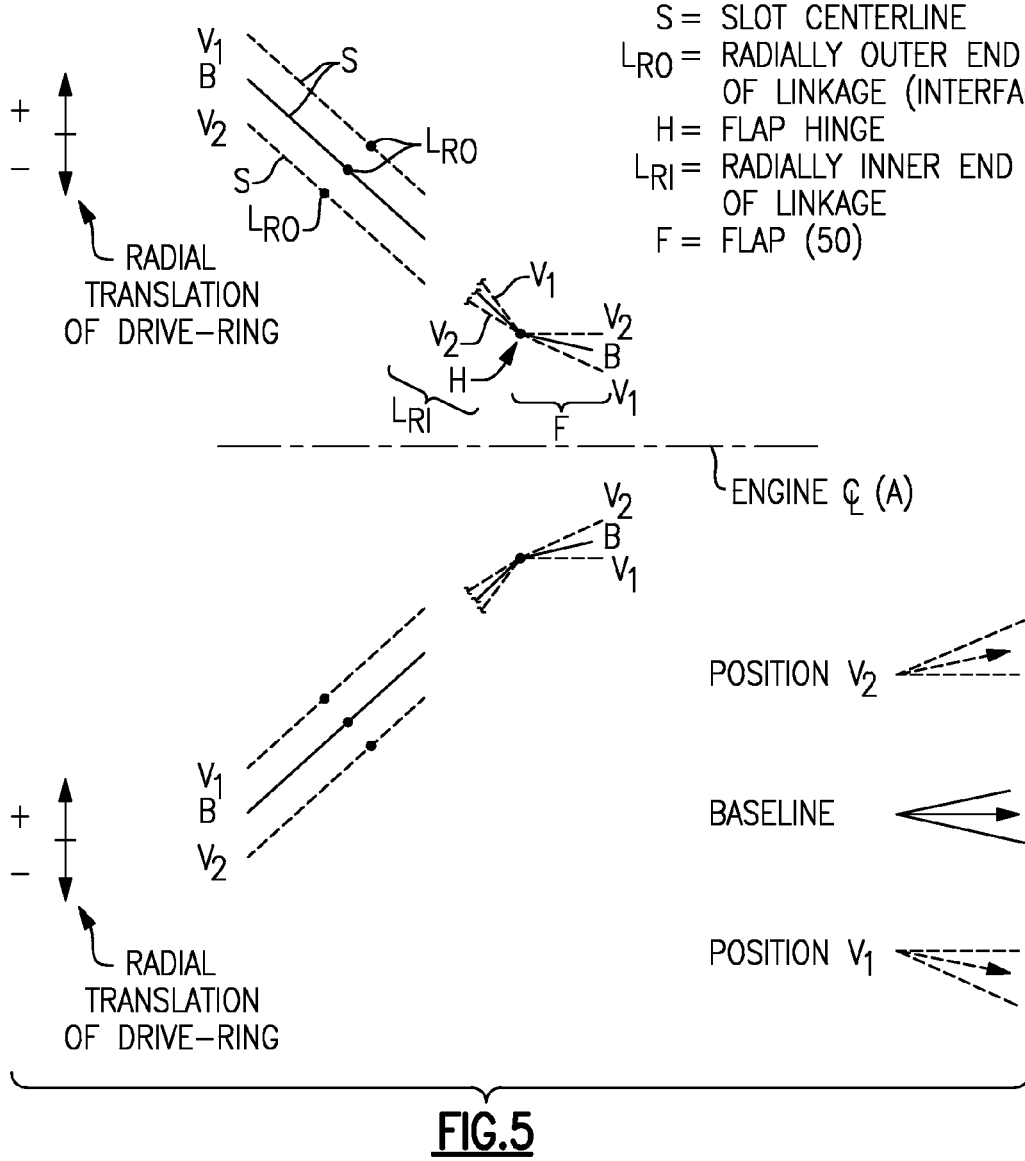
FIG. 5 is a graphical representation of FVAN operations with a linear slot.
Figure 7:
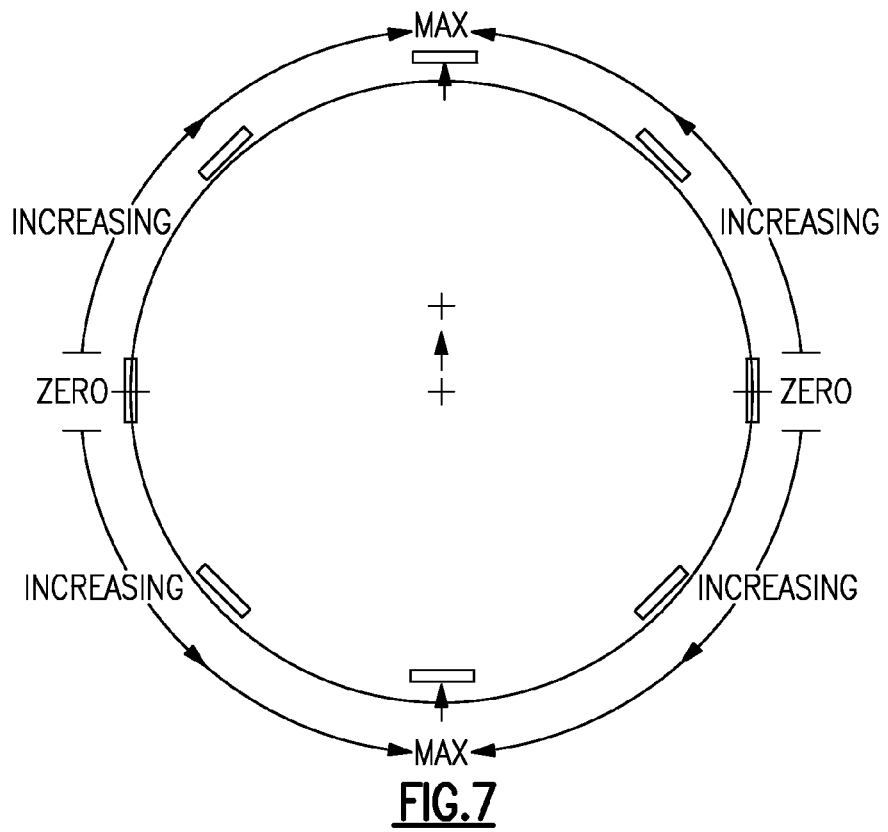
FIG. 7 is a schematic view of flap motion in response to the drive ring in the radially translated "upward" position.
Figure 9:
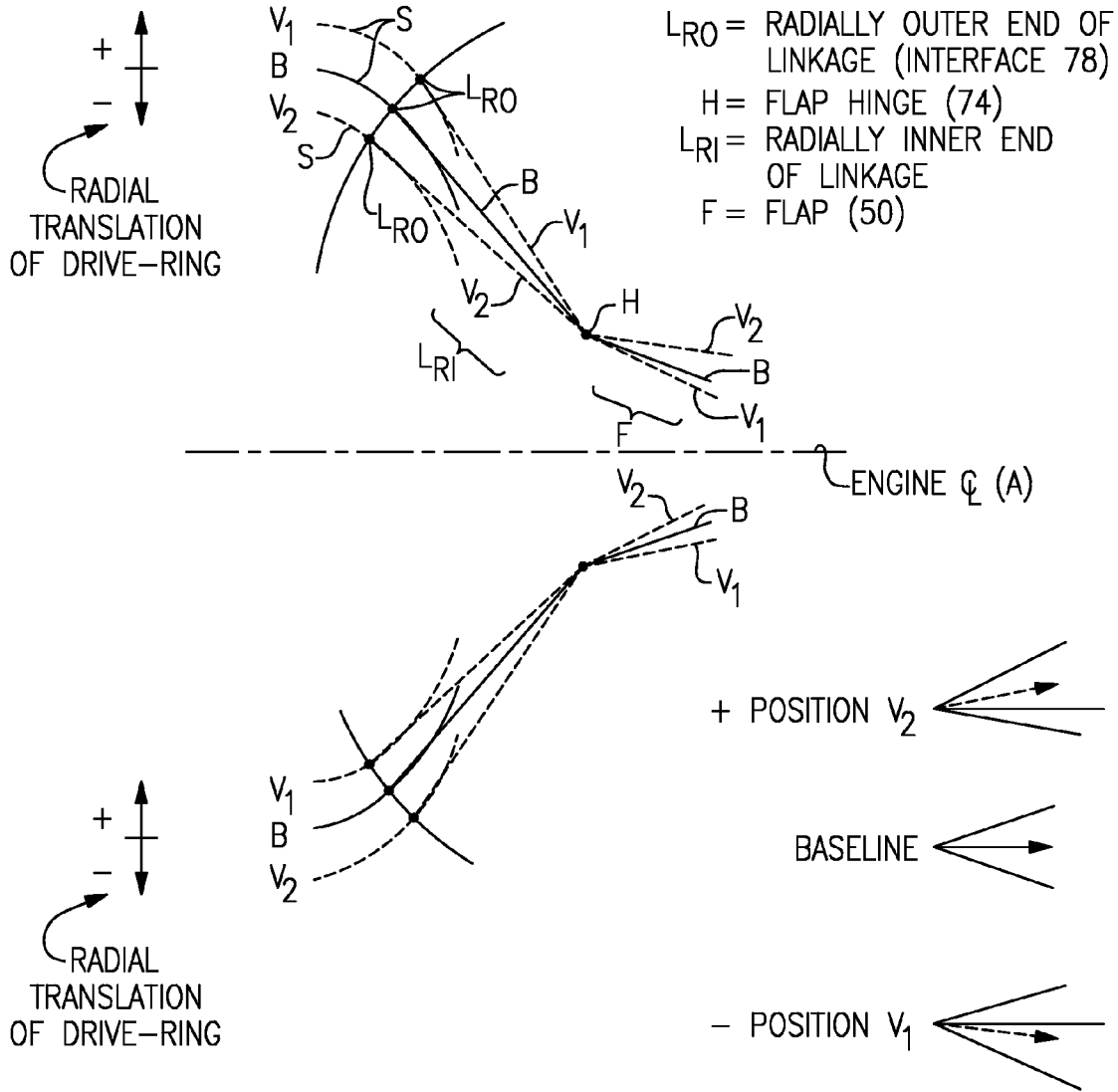
FIG. 9 is a graphical representation of FVAN operations with a curved slot illustrated in FIG. 8.

In the illustrated example, the drive ring 58 has been translated in a radially "upward" vertical direction relative to the engine axis A (FIGS. 6A and 6B; FIGS. 5 and 9 show the effect of both "upward" and "downward" radial translation of the drive ring 58 for a drive ring having a linear slot (FIG. 5) and for a drive ring having a curved slot (FIG. 9)). The interface 78 at the 0 degree and 180 degree position are driven within the slot 76 as constrained by the slot ceiling 76C and slot floor 76F (FIGS. 5, 6B and 9) such that the flap linkage 52 moves slotwise and the flap assembly 48 is pivoted downward (position V1 in FIG. 5). The interface 78 at the 90 and 270 degree position, however, does not move slotwise. However, the circumferential clearance 75 (FIGS. 3B and 3C) accommodates the radial translation of the drive ring 58 relative to the interface such that the flaps 50 associated with these radial stations do not pivot. The flaps 50 at intermediate positions pivot in an intermediate manner (FIG. 7).

In the variants thus far discussed, at any axial position within the drive ring, the slot ceiling and floor each have a constant radius in the circumferential direction. The circumferential clearance 75 (FIGS. 3B and 6B) allows the constant radius slot ceiling 74C and slot floor 74F to move relative to the interfaces, i.e. the clearance 75 precludes mechanical interference between the interface and the flanks of the slot. Because the slot ceiling 76C and slot floor 76F radii are constant in the circumferential direction, the flap linkages 52 associated with the flaps 50 positioned 90 deg. from the direction of drive ring movement (i.e. the flaps at 90 and 270 degrees in the above example) do not move.

Figure 3D:
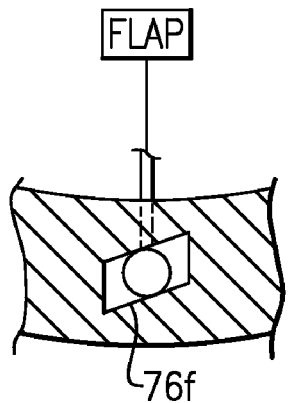
FIG. 3D is a sectional view of another embodiment of the discrete slot illustrating a non-constant radial contour for one flap in the drive ring taken along line X-X in FIG. 3A.
Figure 3E:
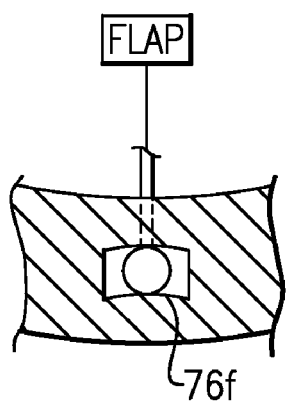
FIG. 3E is a sectional view of another embodiment of the discrete slot illustrating a non-constant radial contour for one flap in the drive ring taken along line X-X in FIG. 3A.
Figure 3F:
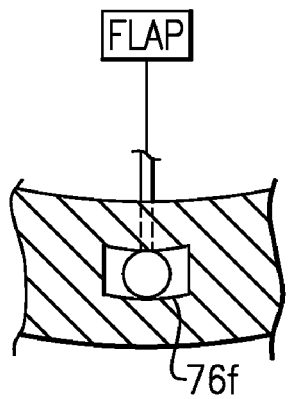
FIG. 3F is a sectional view of another embodiment of the discrete slot illustrating a non-constant radial contour for one flap in the drive ring taken along line X-X in FIG. 3A.

However, the radius of the slot ceiling 76C and slot floor 76F, at any given axial position within the drive ring 58, may vary as a function of circumference. That is, the slot ceiling 76C and slot floor 76F may have other contours such as ramped (FIG. 3D), convex (FIG. 3E), concave (FIG. 3F) as well as other shapes to effect the vectoring of the flaps 50 ninety degrees from the direction of drive ring 58 movement. As the non-constant radius provides a pitch bias to those flaps in response to movement of the interface over the non-constant radius contour rather than the absence of pitching resulting from a constant radius, the non-constant radius contour facilitates fine tuning of the intermediate FVAN 42 sectors in response to radial translation of the drive ring 58. In the case of a circumferentially continuous slot, the non-constant slot ceiling 76C and slot floor 76F contours would repeat periodically around the circumference. It should be understood, that various slot shapes and combinations thereof will likewise be usable with the present invention.

By adjusting the FVAN 42, engine thrust and fuel economy are maximized during each flight regime. The actuator assembly 48 communicates with an engine controller or the like to optimally adjust the position of the FVAN 42. However, other control systems including flight control systems may likewise be usable with the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
a core structure defined about an axis;
a fan structure circumscribing said core structure, said fan structure having a fan variable area nozzle with at least one flap which at least partially defines a fan nozzle exit area between said fan structure and said core structure;
a drive ring segment having a slot;
a flap linkage pivotally mounted to said fan structure, said flap linkage mounted to said at least one flap and engaged within said slot at an interface; and
an actuator system capable of translating said drive ring in at least one of an axial direction and a radial direction relative to said axis to respectively symmetrically vary and asymmetrically vary said fan nozzle exit area.

2. The engine as recited in claim 1, wherein said at least one flap includes a multiple of flaps defined about the fan nozzle exit area.

3. The engine as recited in claim 2, wherein said multiple of flaps define a trailing edge of said fan variable area nozzle.

4. The engine as recited in claim 1, wherein said actuator system includes a multiple of actuators, each of said multiple of actuators pivotally mounted to said fan structure and said drive ring.

5. The engine as recited in claim 1, wherein said slot is a circumferentially continuous slot, each of said flap linkages mounted at least partially within said circumferentially continuous slot.

6. The engine as recited in claim 5, wherein said circumferentially continuous slot includes a curved component.

7. The engine as recited in claim 5, wherein said circumferentially continuous slot includes a linear component.

8. The engine as recited in claim 5, wherein said circumferentially continuous slot extends through an inner diameter of said drive ring.

9. The engine as recited in claim 5, wherein said circumferentially continuous slot includes a slot ceiling and a slot floor.

10. The engine as recited in claim 9, wherein said slot ceiling and said slot floor each define a constant radius at any given axial location with varying circumferential location.

11. The engine as recited in claim 9, wherein said slot ceiling includes a non-constant radius at any given axial location with varying circumferential location.

12. The engine as recited in claim 9, wherein said slot floor includes a non-constant radius at any given axial location with varying circumferential location.

13. The engine as recited in claim 1, wherein said slot has a circumferential clearance relative said interface of said flap linkage.

14. The engine as recited in claim 13, wherein said slot defines a slot ceiling and a slot floor engaged with said interface.

15. The engine as recited in claim 1, wherein said drive ring segment includes a circumferentially continuous slot, a multiple of said flap linkages each engaged within said slot at an interface between a slot ceiling and a slot floor.

16. The engine as recited in claim 1, wherein said interface includes a ball link.

17. A gas turbine engine comprising:
a core engine defined about an axis;
a fan driven by said core engine about said axis;
a core structure defined at least partially about said core engine; and
a fan structure mounted around said fan and at least partially around said core structure, said fan structure having a fan variable area nozzle with a multiple of flaps which defines a fan nozzle exit area downstream of said fan between said fan structure and said core structure;
a drive ring mounted within said fan structure, said drive ring including a slot which extends through an inner diameter of said drive ring;
a multiple of flap linkages extending from the multiple of flaps, each of said multiple of flap linkages pivotally mounted to said fan structure and engaged within said slot at an interface; and
an actuator system which axially translates and radially translates said drive ring relative to said axis to respectively symmetrically vary and asymmetrically vary said fan nozzle exit area.

18. The engine as recited in claim 17, wherein said interface defines a point contact at a slot ceiling and a slot floor.

19. The engine as recited in claim 17, wherein said interface defines a line contact at a slot ceiling and a slot floor.

20. The engine as recited in claim 17, wherein said interface defines a sliding interface at a slot ceiling and a slot floor, said slot defining a circumferential clearance adjacent said interface.

* * * * *